Figure 1:
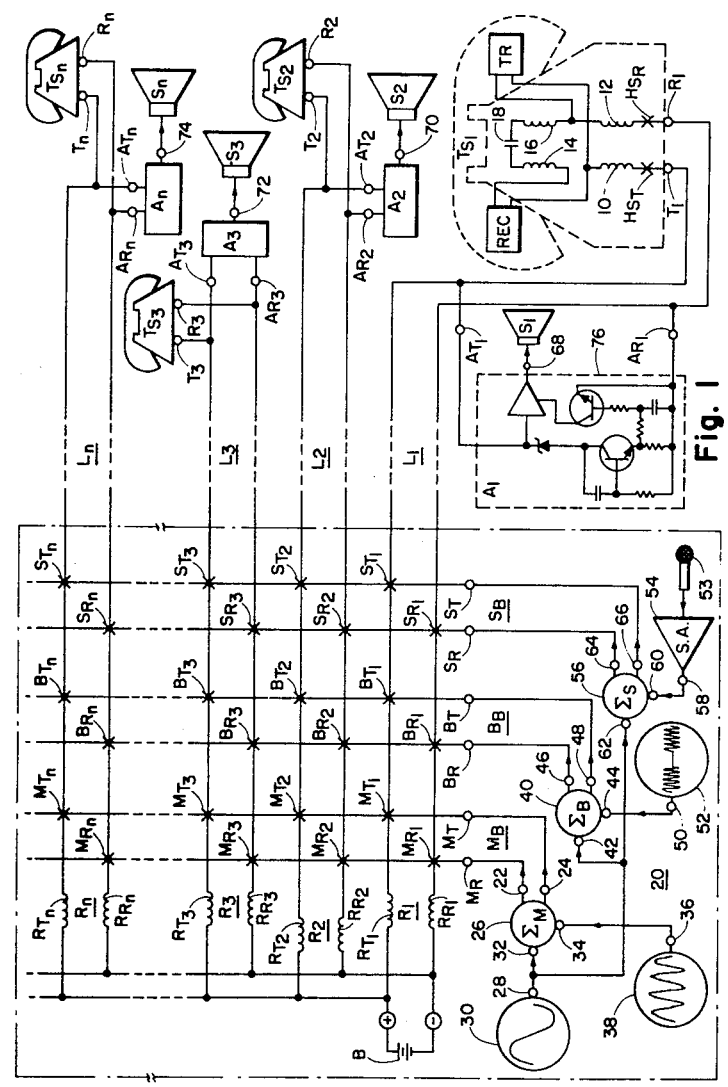

United States Patent [19]

Cowpland et al.

[11] 3,985,976

[45] Oct. 12, 1976

[54] AUDIO FREQUENCY SIGNALLING SYSTEMS FOR TELEPHONE SYSTEMS

[76] Inventors: Michael Christopher John Cowpland, 11 Alderbrook Drive, Ottawa, Ontario K2H 5W4; Terrance Headley Matthews, 99 Penfield Drive, Kanata, Ontario, both of Canada

[22] Filed: Feb. 10, 1975

[21] Appl. No.: 548,798

Related U.S. Application Data

[62] Division of Ser. No. 377,831, July 9, 1973, Pat. No. 3,894,197.

[30] Foreign Application Priority Data

June 26, 1973 Canada .............................. 174906

[52] U.S. Cl. ............................ 179/81 B; 179/1 A; 179/84 T; 330/52
[51] Int. Cl.² ......................................... H04M 1/60
[58] Field of Search ............. 179/1 B, 16 A, 16 AA, 179/16 F, 1 A, 2 R, 2.5 R, 81 B, 84 T, 170 A, 1 HF, 1 VC, 84 VF; 330/51, 199, 52, 137; 307/235 N, 235 J, 235 T

[56] References Cited
UNITED STATES PATENTS

| | | | |
|---|---|---|---|
| 2,824,174 | 2/1958 | Holman ................................ | 179/86 |
| 2,824,175 | 2/1958 | Meacham et al. ..................... | 179/86 |
| 3,501,648 | 3/1970 | Chapman et al. ............... | 307/235 T |
| 3,671,676 | 6/1972 | Henry et al. ....................... | 179/16 F |
| 3,899,644 | 8/1975 | Hunt ................................. | 179/84 R |

FOREIGN PATENTS OR APPLICATIONS

| | | | |
|---|---|---|---|
| 854,316 | 10/1970 | Canada ............................... | 179/16 |

*Primary Examiner*—Kathleen H. Claffy
*Assistant Examiner*—Randall P. Myers
*Attorney, Agent, or Firm*—Craig & Antonelli

[57] ABSTRACT

Audio frequency signalling, from a central location in a telephone system to a remote location serviced by a particular telephone set, is accomplished by connecting an audio frequency amplifier, having a predetermined a.c. threshold voltage level, and a predetermined d.c. voltage level, across the telephone line at said particular telephone set. By concurrently applying a low frequency a.c. pilot signal of an amplitude greater than the a.c. threshold voltage level of the audio frequency amplifier and an audio frequency signal voltage of a lesser amplitude to the telephone line at the central location, when said particular telephone set is on-hook, said audio frequency amplifier is enabled by the low frequency a.c. pilot signal and supplied with operating current from the telephone line. The audio frequency amplifier, thus enabled and energized, attenuates the low frequency a.c. pilot signal and amplifies the audio frequency signal voltage to produce a corresponding audible signal at a loudspeaker coupled to said audio frequency amplifier. When the handset of said particular telephone set is taken off-hook the d.c. voltage across the telephone line at said particular telephone set drops below the predetermined d.c. threshold voltage level to disable said audio frequency amplifier.

25 Claims, 2 Drawing Figures

AUDIO FREQUENCY SIGNALLING SYSTEMS FOR TELEPHONE SYSTEMS

This application is a division of Ser. No. 377,831, filed July 9, 1973, now U.S. Pat. No. 3,894,197.

This invention relates to audio frequency signalling systems for use in telephone systems and, more particularly, to an electronic audio frequency signalling system for transmitting audio frequency signals from a central location along a selected telephone line to an audio frequency amplifier connected across said selected telephone line near the telephone set terminating said selected telephone line.

In conventional telephone systems such as step-by-step, crossbar, key telephone systems, and private automatic branch exchange (P.A.B.X.), "ringing" signalling, from a central location to a telephone set at a remote location, is usually accomplished by an electromechanically operated bell energized by interrupted 20 Hz 86 volts rms supply. In P.A.B.X.'s intended for hotel use, "message" signalling is usually accomplished through the use of neon "message lamps," located at the telephone station sets, which are actuated by a 20 Hz 30 volts rms supply. In the case of "message" signalling the 30 volts rms actuating voltage is applied continuously to a selected telephone line until the message is acknowledged by the party at the remote location corresponding to said selected telephone line.

In newer telephone systems, the various switching functions are performed by solid state switches unlike in older telephone systems where relay contacts are used.

Because of the relatively large message and ringing signal voltages required (30 volts rms and 86 volts rms respectively), it has been necessary to introduce the message and ringing voltage to these newer telephone systems through relay contacts which carry the required ringing and message currents while isolating the solid state switches of these newer telephone systems.

As it is undesirable to mix electronic and electromechanical elements in a switching system, because of the excessive bulk and poor reliability associated with electromechanical relays as well as because of voltage transients introduced by operation of said relays, a solid state signalling system has been developed which can be used in the majority of the telephone systems currently in use and which should prove suitable for a large number of telephone systems yet to be developed. It has been recognized that if the signal voltages required to provide the various signalling functions are reduced in amplitude to voltage levels compatible with solid state crosspoints, relay contacts would no longer be required to isolate said solid state crosspoints and carry the ringing and message currents. Furthermore, by providing audio frequency signals of different duration, frequency, and amplitude, the various signalling functions, such as ringing and message, can be conveniently generated. Because it is preferable to maintain the magnitudes of the various signalling voltages at relatively small values, in order to minimize crosstalk between telephone lines, an audio frequency amplifier is provided at each remote telephone set in the proposed signalling system to amplify the audio frequency signals to a level suitable for driving an electro-acoustic transducer such as a loudspeaker. Furthermore, by energizing each audio frequency amplifier with the d.c. (direct current) voltage applied to each telephone line, by the central battery at the central location, and by providing a suitable d.c. threshold voltage which must be exceeded before each audio frequency amplifier will draw operating direct current from its corresponding telephone line, each audio frequency amplifier can be effectively disabled by the reduction in d.c. voltage appearing at a telephone set, or equivalently at said amplifier input terminals, when the handset corresponding to said telephone set is taken off-hook. The provision of a d.c. voltage threshold in the range of 12 to 40 volts disables the audio frequency amplifier when the telephone set is in use (hook switch contacts are closed) and thereby prevents acoustical feedback between the audio frequency amplifier and the voice transmitter unit of the corresponding telephone set.

In order to prevent each audio frequency amplifier from drawing operating direct current from the telephone line when the telephone handset of the corresponding telephone set is on-hook, if said amplifier is idle, as it is in the standby mode, each amplifier is also provided with an a.c. (alternating current) threshold voltage level which must also be overcome before said amplifier can be energized by the d.c. voltage appearing across the telephone line. The a.c. threshold level is set at a predetermined voltage level in the range of 0.05 to 5.0 volts rms such that background noise and random voltage signals present on the telephone lines due to crosstalk and other phenomena will not normally turn on the audio frequency amplifiers and be heard by the parties at the respective telephone sets.

By providing an audio frequency amplifier at each station set equipped with both a.c. and d.c. threshold voltage levels, the required signalling voltage levels can be kept at a minimum voltage level thereby reducing the possibility of crosstalk between telephone lines; current drain on, or loading of the battery at the central location can be kept to a minimum; the audio frequency amplifiers can be readily disabled by the reduced d.c. voltage level appearing across the telephone lines at telephone sets when said telephone sets are off-hook and in use; and the audio frequency amplifiers can be effectively muted in the standby mode to ignore noise and other low voltage level random signals present on the telephone lines.

Another advantage, or feature, which is not available in existing signalling systems arises as a direct outcome of the presence of an audio frequency amplifier at each telephone set. More particularly, a general or selected public address facility can be readily obtained by providing a microphone and speech amplifier at the central location which can be selectively or generally connected to the telephone lines in order to transmit voice or music signals to the amplifiers located at the remotely located telephone sets.

Because of the wide variation in voltage amplitude associated with speech and music signals, it is desirable to add a low frequency carrier or a.c. pilot signal to the speech or music signals to ensure that the amplifier or amplifiers remain on during the transmission interval. The a.c. pilot signal is preferably of a low frequency to facilitate the subsequent removal of the a.c. pilot signal from the voice or music signal at the audio frequency amplifiers. It may also be desirable at times, particularly when minimizing crosstalk is a prime consideration, to also transmit a low frequency pilot signal with the ringing and message signals as the magnitudes of the ringing and message signals can then be greatly reduced because the pilot signal amplitude will serve to overcome the a.c. threshold voltage level of the audio frequency amplifiers.

Although the a.c. pilot signal is preferably of a low frequency to facilitate removal from the voice frequency or music signals at the audio frequency amplifier and to minimize capacitive coupling of said pilot signal to adjacent telephone lines, higher frequency pilot signals can be used particularly in systems where crosstalk reduction is a lesser consideration and it is neither necessary nor desirable to attenuate the pilot signal at the audio frequency amplifiers.

Although an audio frequency signalling system in accordance with the present invention is ideally suited for hotel use, it is also suitable for any other application wherein it is desirable to signal a remote location from a central location along a telephone line.

Thus in accordance with the present invention, there is provided in a telephone system having a plurality of telephone sets, each telephone set being connected via a telephone line to a d.c. voltage supply at a central location, each telephone set having circuitry adapted for connection via hook switch contacts to said telephone line, a signalling system comprising a plurality of audio frequency amplifiers, each audio frequency amplifier being coupled to a corresponding electro-acoustic transducer, each audio frequency amplifier having a pair of amplifier input terminals for jointly receiving audio frequency signal voltage and d.c. operating voltage, each audio frequency amplifier corresponding to a particular telephone set and connected via said amplifier input terminals, across the telephone line connected to said particular telephone set, each audio frequency amplifier drawing d.c. current from said telephone line when the d.c. voltage appearing across said amplifier input terminals is greater than predetermined d.c. threshold voltage level and when an a.c. voltage concurrently appears across said amplifier input terminals at a voltage level greater than a predetermined a.c. threshold voltage level, said predetermined d.c. threshold voltage level being greater than the d.c. voltage appearing across said amplifier input terminals when the hook switch contacts of the telephone set corresponding to said amplifier are closed; means for generating an audio frequency signal voltage; means for applying said audio frequency signal voltage to the input terminals of the audio frequency amplifier corresponding to a particular telephone set; whereby when the hook switch contacts of a particular telephone set are open, such that the d.c. voltage level appearing at the amplifier input terminals of the amplifier corresponding to fluid particular telephone set exceeds the d.c. threshold voltage level of said amplifier, and when the a.c. voltage applied to the amplifier input terminals of said amplifier overcome the a.c. threshold voltage level of said amplifier and thereby enables said amplifier, said amplifier draws current from said d.c. voltage supply to generate an audible signal at the electro-acoustic transducer corresponding to said audio frequency amplifier, said audible signal corresponding substantially to the audio frequency signal voltage appearing at the amplifier input terminals of said amplifier.

Figure 2:
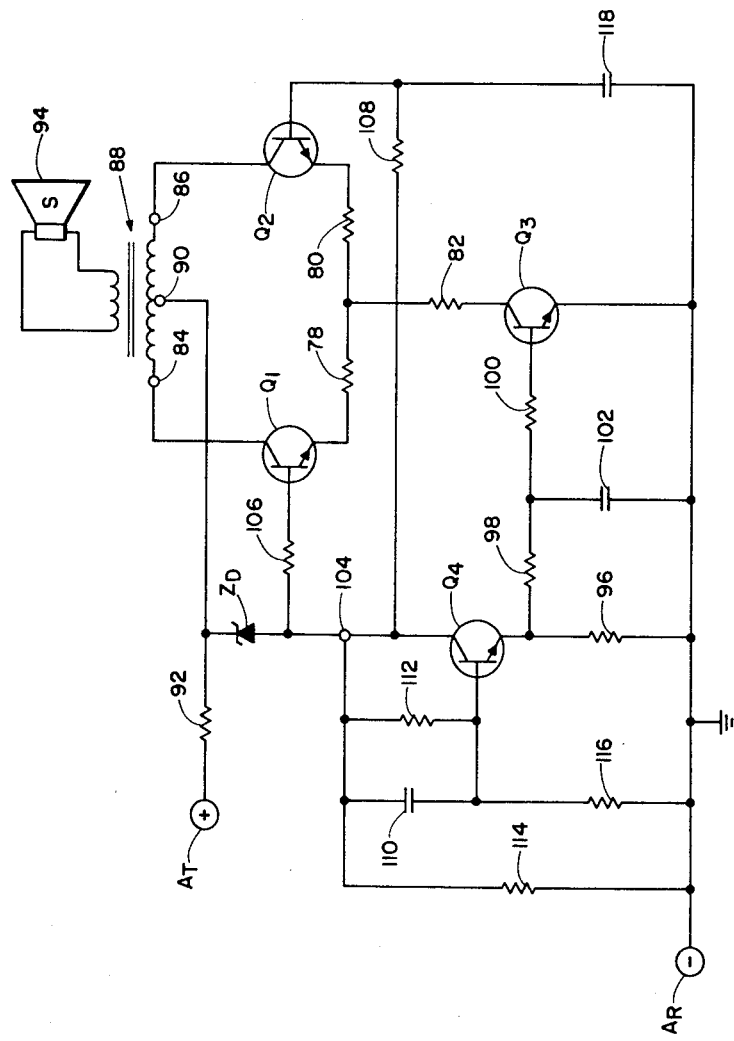

In drawings which illustrate one embodiment of the invention,

FIG. 1 is a schematic drawing of an audio frequency signalling system illustrating the various interconnections of said audio frequency signalling system to a simplified telephone system, FIG. 2 is a schematic diagram of any one of the audio frequency amplifiers illustrated in FIG. 1.

With reference to FIG. 1, the various elements of the simplified telephone system will first be described prior to describing the elements which comprise the audio frequency signalling system attached thereto.

As is typical in a telephone system, a number of telephone sets $T_{S1}, T_{S2}, T_{S3} \ldots T_{Sn}$ are connected via corresponding telephone lines $L_1, L_2, L_3 \ldots L_n$ and corresponding telephone line relays $R_1, R_2, R_3 \ldots R_n$ to a d.c. voltage supply or central battery B located at a central location 20.

Each telephone line relay has a pair of windings which are connected in series with the tip and ring conductors of a corresponding telephone line. For example, relay coil $R_{T1}$ of line relay $R_1$ links the positive terminal of the central battery B to the tip terminal $T_1$ of telephone set $T_{S1}$ via the tip conductor of telephone line $L_1$; and relay coil $R_{R1}$ of line relay $R_1$ links the negative terminal of the central battery B to the ring terminal $R_1$ of the telephone set $T_{S1}$ via the ring conductor of telephone line $L_1$.

A simplified form of the telephone circuitry or speech circuit is shown in FIG. 1 within the dotted outline of telephone set $T_{S1}$. As this telephone circuitry is conventional in form, and well known in the art, it will not be described here as it has been introduced primarily to illustrate the function and connections of hook switch contacts $H_{ST}$ and $H_{SR}$ of telephone set $T_{S1}$. Elements REC and TR respectively, correspond to the typical voice receiver and voice transmitter units while windings 10, 12, 14 and 16, along with capacitor 18, form the conventional telephone sidetone network. It can be seen that when telephone set $T_{S1}$ is on-hook, as illustrated in FIG. 1, hook switch contacts $H_{ST}$ and $H_{SR}$ are open and the full direct current voltage of the direct current voltage supply or central battery B (typically 48 volts) appears across the tip $T_1$, and ring $R_1$, terminals of telephone set $T_{S1}$. When telephone set $T_{S1}$ is off-hook however, as is the case when telephone set $T_{S1}$ is in use, hook switch contacts $H_{ST}$ and $H_{SR}$ are closed and the speech circuit of telephone set $T_{S1}$ draws operating current from the d.c. voltage supply or central battery B at the central location 20. The resistance of coils $R_{T1}$ and $R_{R1}$ of line relay $R_1$, and the ever present loop resistance of telephone line $L_1$, drop the voltage appearing across the tip $T_1$ and ring $R_1$ terminals of telephone set $T_{S1}$, when telephone set $T_{S1}$ is on-hook, to a typical voltage value of approximately 12 volts d.c. for a nominally 48 volt central battery or d.c. voltage supply.

Although it has not been illustrated in FIG. 1, as is not necessary for the understanding of the present invention, it is understood that means would be provided to link the various telephone lines $L_1, L_2, L_3 \ldots L_n$ for purposes of normal interparty telephone communication. In a simple telephone office, mechanical contacts associated with the central line switching circuitry (also not shown) would link the sides of the telephone lines $L_1, L_2, L_3 \ldots L_n$ removed from the central battery B by the coils of line relays $R_1, R_2, R_3 \ldots R_n$ by capacitors in the manner known to the art. Furthermore, although line relays $R_1, R_2, R_3 \ldots R_n$ are shown in FIG. 1 as sensors of direct current flow along telephone lines $L_1, L_2, L_3 \ldots L_n$, the audio frequency signalling system in accordance with the present invention will perform equally well when other forms of current sensors, such as ferrod sensors or solid state line sensors are used.

Turning now to the audio frequency signalling system circuitry, it can be seen that a large portion of the said signalling system circuitry is located at the central location as indicated by the dashed outline 20 surrounding the left-hand portion of the drawing of FIG. 1. In addition, audio frequency amplifiers $A_1$, $A_2$, $A_3$ ... $A_n$, respectively, assigned to telephone sets $T_{S1}$, $T_{S2}$, $T_{S3}$ ... $T_{Sn}$, are connected across the tip and ring conductors of the telephone lines terminating at said telephone sets.

At the central location 20 the audio frequency signalling system circuitry comprises a message bus $M_B$ having message ring $M_R$ and message tip $M_T$ terminals; a bell bus $B_B$ having bell ring $B_R$ and bell tip $B_T$ terminals; and a speech bus $S_B$ having speech ring $S_R$ and speech tip $S_T$ terminals.

The message ring $M_R$ and message tip $M_T$ terminals of the message bus $M_B$ are respectively connected to the output terminals 22, 24 of a message adder 26 which is labelled as $\Sigma_m$ in FIG. 1. The output terminal 28 of a low frequency a.c. pilot signal generator 30 is connected to the output terminal 36 of a message signal generator 38. Although not apparent from the waveforms drawn within message signal generator 38 and a.c. pilot signal generator 30, the frequency of the pilot signal is generally sub audio, usually less than 20 Hz, but it may be as high as 300 Hz, while the frequency of the message signal generator 38 is generally at least several times higher. It can be seen that the message adder 26 serves to add the message voltage signal from the output terminal 36 of the message signal generator 38 and the a.c. pilot signal from the output terminal 28 of the a.c. pilot signal generator 30 and to apply the resultant or combined signal to the message tip $M_T$ and message ring $M_R$ terminals of the message bus $M_B$.

In a similar manner the bell adder 40 adds the a.c. pilot signal appearing at one input terminal 42 and a ringing signal appearing at another input terminal 44 and applies the resultant or combined signal via the output terminals 46, 48 of said bell adder 40, to the bell ring $B_R$ and bell tip $B_T$ terminals respectively of the bell bus $B_B$. The ringing signal, which appears at the output terminal 50 of the ringing generator 52, is generally interrupted at a rate similar to the rate of interruption of the usual 20 Hz ringing current found in conventional ringing systems.

In order to provide a public address facility, a microphone 53 and speech amplifier 54 are used in conjunction with a speech adder 56, (labelled $\Sigma_S$ in FIG. 1) and a speech bus $S_B$. The output terminal 58 of the speech amplifier 54 is connected to one input terminal 60 of the speech adder 56 which an a.c. pilot signal from the a.c. pilot signal generator 30 is connected to another input terminal 62 of said speech adder 56. Output terminals 64 and 66 of the speech adder 56 are respectively connected to the speech ring $S_R$ and speech tip $S_T$ terminals of the speech of the speech bus $S_B$ for application thereto of the resultant signals from the speech amplifier 54, and a.c. pilot signal generator 30.

As the message bus $M_B$, the bell bus $B_B$ and the speech bus $S_B$ are similar, if not identical in structure, the method of interconnection of the various busses with the various telephone lines $L_1$, $L_2$, $L_3$ ... $L_n$ will be described with refeerence to the speech bus $S_B$ only.

In the simplified audio frequency signalling system illustrated in FIG. 1, the speech ring terminal $S_R$ of the speech bus $S_B$, can be connected to the ring terminals of telephone lines $L_1$, $L_2$, $L_3$ ... $L_n$ via speech ring contacts $S_{R1}$, $S_{R2}$, $S_{R3}$ ... $S_{Rn}$ respectively, while the speech tip terminal $S_T$ of the speech bus $S_B$ can be connected to the tip terminals of telephone lines $L_1$, $L_2$, $L_3$ ... $L_n$ via speech tip contacts $S_{T1}$, $S_{T2}$, $S_{T3}$ ... $S_{Tn}$ respectively. For maximum system flexibility the aforementioned contacts $S_{R1}$, $S_{T1}$; $S_{R2}$, $S_{T2}$; $S_{R3}$, $S_{T3}$ ... $S_{Rn}$ ... $S_{Tn}$ are arranged such that the speech bus $S_B$ can be connected to any telephone line or any group of telephone lines at any one time. Corresponding tip and ring contacts such as $S_{R1}$, $S_{T1}$; $S_{R2}$, $S_{T2}$; $S_{R3}$, $S_{T3}$ ... $S_{Rn}$, $S_{Tn}$ are generally arranged to operate as contact pairs particularly when said contacts are mechaniccal contacts. Although connection from the speech bus $S_B$ to a selected telephone line is described in terms of speech tip and speech ring contact pairs for simplicity, it is understood that a matrix of electronic crosspoints could also be used to establish contact from the speech bus $S_B$ to selected telephone lines.

In a similar manner the bell ring $B_R$ and bell tip $B_T$ terminals of the bell bus $B_B$ can be respectively connected via contact pairs $B_{R1}$, $B_{T1}$; $B_{R2}$, $B_{T2}$; $B_{R3}$, $B_{T3}$ ... $B_{Rn}$, $B_{Tn}$ to telephone lines $L_1$, $L_2$, $L_3$ ... $L_n$; and the message ring $M_R$ and message tip $M_T$ terminals of the message bus $M_B$ can be respectively connected via contact pairs $M_{R1}$, $M_{T1}$; $M_{R2}$, $M_{T2}$; $M_{R3}$, $M_{T3}$ ... $M_{Rn}$, $M_{Tn}$ to said telephone lines $L_1$, $L_2$, $L_3$ ... $L_n$.

In addition to the aforementioned portion of the audio frequency signalling system circuitry which is located at the central location 20, audio frequency amplifiers $A_1$, $A_2$, $A_3$ ... $A_n$ are respectively connected across telephone lines $L_1$, $L_2$, $L_3$ ... $L_n$ at telephone sets $T_{S1}$, $T_{S2}$, $T_{S3}$ ... $T_{Sn}$ as illustrated in FIG. 1. The audio frequency amplifiers $A_1$, $A_2$, $A_3$ ... $A_n$ are respectively connected via corresponding amplifier input terminal pairs $A_{R1}$, $A_{T1}$; $A_{R2}$, $A_{T2}$; $A_{R3}$ ... $A_{Rn}$, $A_{Tn}$ to the ring and tip conductors of the telephone lines terminating at telephone sets $T_{S1}$, $T_{S2}$, $T_{S3}$ ... $T_{Sn}$. Additionally, as illustrated in FIG. 1, loudspeakers $S_1$, $T_{S2}$, $S_3$ ... $S_n$ are respectively connected to the output terminals 68, 70, 72, 74 of the audio frequency amplifiers $A_1$, $A_2$, $A_3$ ... $A_n$.

In FIG. 1, audio frequency amplifier $A_1$, which is connected via amplifier input terminals $A_{R1}$, $A_{T1}$ across the ring and tip conductors of telephone line $L_1$, is shown in simplified schematic from within the dashed rectangle 76. As the aforementioned simplified schematic form of audio frequency amplifier $A_1$ appears in FIG. 1 solely to indicate the interconnections of the audio frequency amplifiers with the simplified telephone system circuitry, a detailed explanation of a typical audio frequency amplifier circuit will now follow with respect to the detailed audio frequency amplifier schematic illustrated in FIG. 2.

Turning now to FIG. 2, it can be seen that a representative audio frequency amplifier comprises a pair of emitter coupled transistors $Q_1$, $Q_2$ arranged as a long tailed pair differential amplifier. The emitters of the first $Q_1$ and the second $Q_2$ transistors of said emitter coupled transistor pair are respectively connected via emitter resistors 78 and 80 to a common emitter resistor 82 and thereafter through the collector-emitter junction of a third transistor $Q_3$ to circuit ground. The collector electrodes of the emitter coupled transistors $Q_1$, $Q_2$ are respectively connected to first and second end terminals 64, 66 of the primary winding of a center tapped output transformeer 88 while the center tap terminal 90 of said transformer 88 is connected via resistor 92 to one terminal $A_T$ of the amplifier input terminals $A_T$, $A_R$.

The secondary winding of the output transformer 88 is connected to a loudspeaker 94 which is also designated by an S in FIG. 2. The center tap terminal 90 of the output transformer 88 is connected to the cathode of a zener diode $Z_D$, while the anode of said zener diode $Z_D$ is connected to the collector electrode of a fourth transistor $Q_4$. The emitter of the fourth transistor $Q_4$ is connected via resistor 96 to circuit ground; and via a low pass filter comprising resistors 98, 100 and capacitor 102 to the base electrode of the third transistor $Q_3$. The junction 104 of the anode of the zener diode 20 and the collector electrode of the fourth transistor $Q_4$ is connected via resistors 106 and 108 to the base electrodes of the first and second transistors respectively. Additionally, said junction 104 is connected, via a first capacitance means, comprising capacitor 110 in parallel with resistor 112, to the base electrode of the fourth transistor $Q_4$; and via resistor 114 to circuit ground. The base electrode of the fourth transistor $Q_4$ and the base electrode of the second transistor $Q_2$ are respectively connected to circuit ground via resistor 116 and capacitor 118. As shown in FIG. 2, the other amplifier input terminal $A_R$ is connected to the circuit ground of the audio frequency amplifier.

Although transistors $Q_1$, $Q_2$, $Q_3$ and $Q_4$ are shown as npn type transistors in FIG. 2, by replacing said transistors with pnp transistors and by reversing the connections of the zener diode $Z_D$, the audio frequency amplifiers can be connected to operate with reverse polarity (e.g. amplifier input terminal $A_T$ negative with respect to amplifier input terminal $A_R$).

Various modifications to the circuit of FIG. 2 can be made depending on the requirements of the audio frequency signalling system. For example, resistor 92, which limits the current drawn by the amplifier circuitry to non-destructive levels in the event of voltage transients, can be omitted, if desired, or replaced by voltage suppression circuitry or other forms of current limiting circuitry. Resistor R112, which serves to bias the base of transistor $Q_4$ to a voltage level slightly above ground approximately 0.7 volts), can be omitted if a less sensitive a.c. threshold voltage level is required. Additionally, degenerative emitter resistors 78 and 80, which are in the emitter circuits of transistors $Q_1$ and $Q_2$ can be omitted if distortion due to signal overload can be tolerated.

Because of the special features of the audio frequency amplifiers used in the audio frequency signalling system in accordance with the present invention, the operation of said audio frequency amplifiers will be described prior to a description of the operation of the complete audio frequency signalling system.

Consider the circuit illustrated in FIG. 2 when a d.c. voltage greater than the zener voltage of zener diode $Z_D$ is applied across the input terminals $A_T$ and $A_R$ of the audio frequency amplifier with the polarity shown. The application of said d.c. voltage causes direct current to flow from amplifier input terminal $A_T$ through zener diode $Z_D$ and resistor 114 to amplifier input terminal $A_R$. If resistor 112 is used, part of the direct current through the zener diode $Z_D$ will flow through said resistor 112, the base emitter junction of a fourth transistor $Q_4$ and resistor 96 to circuit ground. It should be noted that said circuit ground, which is connected to amplifier input terminal $A_R$, is not connected to the telephone system ground in order to preserve the balance of the telephone lines. Part of the direct current carried by zener diode $Z_D$ will also flow through resistor 112 and resistor 116 to ground. It should also be noted that although the bases of transistors $Q_1$ and $Q_2$ are biased by the voltage appearing at the junction 104 of the anode of the zener diode $Z_D$ and the collector of the fourth transistor $Q_4$, no current is drawn by transistors $Q_1$ and $Q_2$ as transistor $Q_3$ is, by assumption, not conducting at this time.

When an a.c. signal voltage appears across the amplifier input terminals $A_T$, $A_R$ with a magnitude sufficient to overcome the a.c. threshold voltage level of the audio frequency amplifier, said a.c. signal voltage passes readily through zener diode $Z_D$ and is coupled to the bases of transistors $Q_1$ and $Q_2$ via resistors 106 and 108 respectively. Note zener diode $Z_D$, being suitably biased with direct current via resistor 114, exhibits a very low a.c. impedance. The above-mentioned a.c. signal voltage is coupled via capacitor 110 to the base of transistor $Q_4$ and is superimposed upon the small d.c. forward bias (approximately 0.7 volts) appearing thereat. Said a.c. signal voltage is rectified by the fourth transistor $Q_4$ and a corresponding d.c. voltage signal which consequently appears across capacitor 102 of the low pass filter serves to turn ON the third transistor $Q_3$. Resistor 100 presents rapid discharge of the d.c. voltage signal appearing across capacitor 102 by the base emitteer circuit of the third transistor $Q_3$ so as to prevent toggling of said third transistor $Q_3$ at the frequency of the a.c. signal voltage. When said a.c. signal voltage turns ON the third transistor $Q_3$, thereby enabling said amplifier by completing a connection for the emitter circuits of the first $Q_1$ and second $Q_2$ transistors to circuit ground; and when the d.c. line voltage present across the amplifier input terminals $A_T$, $A_R$ exceeds the zener diode voltage of zener diode $Z_D$; the first $Q_1$ and second $Q_2$ transistors of said amplifier draw operating direct current from the telephone line across which said amplifier is connected. Because of the symmetrical nature of the differential amplifier portion of said amplifier, (e.g. the long tailed pair differential amplifier circuitry associated with the first $Q_1$ and second $Q_2$ transistors) caapacitor 118 has been added to provide a low impedance a.c. path from the base of transistor $Q_2$ to ground.

For a.c. signals in the audio frequency range, the capacitance of capacitor 118 is chosen to present a low a.c. impedance path to circuit ground in order to establish a voltage difference between the a.c. voltage signals appearing at the bases of the first $Q_1$ and second $Q_2$ transistors and thereby resulting in an amplified voltage difference signal being coupled to the loudspeaker 94. Because capacitor 118 is also chosen to present a fairly high a.c. impedance at the low a.c. frequency of the pilot signal voltage, no significant a.c. voltage difference, attributable to the a.c. pilot signal voltage, appears between the bases of the first $Q_1$ and second $Q_2$ transistors. Accordingly, as both transistors $Q_1$ and $Q_2$ amplify the pilot signal voltage and generate substantially equal but subtractive currents in the primary winding of the output transformer 88, the pilot signal voltage is effectively removed while the audio frequency signals accompanying said pilot signal, which may be tones, voice, or music, are coupled to the loudspeaker 94.

Turning now to the operation of the overall system illustrated in FIG. 1. Assume that telephone set $T_{S1}$ is on-hook and that it is desirable to send an announcement to the party serviced by telephone set $T_{S1}$. Contacts $S_{R1}$ and $S_{T1}$ are closed at the central location 20 to respectively connect the speech ring $S_R$ and speech tip $S_T$ terminals of the speech bus $S_B$ across the telephone line $L_1$. Note, if it is desired to send an announcement to all or selected parties, the speech bus $S_B$ can be connected to all the telephone lines simultaneously or to selected telephone lines simply by closing the necessary contact pairs among contact pairs $S_{R2}$, $S_{T2}$; $S_{R3}$, $S_{T3}$ ... $S_{Rn}$, $S_{Tn}$.

The speech signal, appearing at the input terminal 60 of the speech adder 56, is added to the a.c. pilot signal, appearing at the input terminal 62 of said speech adder 56, and the combined audio frequency signal is transmitted via speech bus $S_B$ and along telephone line $L_1$ to enable the audio frequency amplifier $A_1$ located at telephone set $T_{S1}$. Since the hook switch contacts $H_{ST}$ and $H_{SR}$ are open, the voltage across the amplifier input terminals $A_{R1}$, $A_{T1}$ exceeds the d.c. threshold voltage level of audio frequency amplifier $A_1$ and as said amplifier $A_1$ is enabled by said combined signal as aforesaid, said amplifier $A_1$ draws operating direct current from telephone line $L_1$ and amplifies the incoming speech signal portion of said combined signal. As previously described, with reference to the operation of a typical audio frequency amplifier illustrated in FIG. 2, the a.c. pilot signal is removed by the differential design of the audio frequency amplifier while the audio frequency signal is amplified and coupled to the loudspeaker $S_1$.

In an analogous manner the ringing signal, appearing at the output terminal 50 of the ringing generator 52, is added to the pilot signal by the bell adder 40 and the resultant or combined signal appears at output terminals 46, 48 of the bell adder 40, or equivalently across the bell ring $B_R$ and bell tip $B_T$ terminals of the bell bus $B_B$. By closing appropriate contact pairs among contact pairs $B_{R1}$, $B_{T1}$; $B_{R2}$, $B_{T2}$; $B_{R3}$, $B_{T3}$ ... $B_{Rn}$, $B_{Tn}$, the ringing signal appearing across the bell bus $B_B$ can be connected to a selected one of the telephone lines, and transmitted to the audio frequency amplifier corresponding to the telephone set terminating said selected telephone lines. If crosstalk reduction is not a prime consideration, a larger voltage signal can be generated by the ringing generator 52 and said larger signal can be sent without an a.c. pilot signal to the selected audio frequency amplifier.

Similarly, message signals appearing across the message ring $M_R$ and message tip $M_T$ terminals of the message bus $M_B$ can be connected to one or more selected telephone lines for transmission to corresponding audio frequency amplifiers by closing appropriate contact pairs among contact pairs $M_{R1}$, $M_{T1}$; $M_{R2}$, $M_{T2}$; $M_{R3}$, $M_{T3}$ ... $M_{Rn}$, $M_{Tn}$.

It can now be seen that message, ringing and speech signals can be simultaneously transmitted to one or more remotely located parties. Each type of signal (message, ringing or speech) can be simultaneously sent to one or more parties and different types of signals can be simultaneously transmitted from the central location 20 to different parties or groups of parties. It would be possible, were it desirable, to transmit all three types of signals simultaneously to a given party.

When a telephone set is taken off-hook, as is done to receive a call, the drop in d.c. voltage at said telephone set to a value of slightly less than 12 volts when a 48 volt central battery B is used, disables the audio frequency amplifier corresponding to said telephone set and prevents acoustical feedback. The a.c. threshold of the audio frequency amplifier minimizes drain on the central location battery 3, ensures confidentiality by preventing said amplifiers from responding to crosstalk voltage signals and minimizes annoying background noise pickup.

What is claimed is:
1. In combination with an amplifier for connection to a transmission line, the improvement comprising:
   a. means responsive to a predetermined a.c. voltage and a d.c. voltage carried by the transmission line for applying said a.c. voltage to said amplifier in the event said a.c. voltage has an amplitude above a first predetermined amplitude threshold and for generating an enabling voltage in the event said a.c. voltage has an amplitude above a first predetermined amplitude threshold and said d.c. voltage has an amplitude above a second predetermined amplitude threshold;
   b. means responsive to the presence of said enabling voltage for enabling said amplifier by applying said d.c. voltage as a power supply to said amplifier; and
   c. means for inhibiting translation of said predetermined a.c. voltage by the enabled amplifier, while allowing translation of other audio frequency signals which may be present on the transmission line.

2. The combination as defined in claim 1, wherein said means responsive to the presence of a d.c. voltage includes means for applying said d.c. voltage from the transmission line to the amplifier only upon the d.c. voltage exceeding the amplifier d.c. voltage threshold for powering the amplifier therefrom.

3. In combination with an amplifier for connection to a telephone type line, the improvement comprising:
   a. means for sensing a d.c. voltage above a first threshold level carried by the telephone line,
   b. means for sensing a predetermined a.c. voltage above a second threshold level carried by the telephone line,
   c. means for enabling said amplifier to amplify message signals received from the telephone line only when the amplitude of both the d.c. voltage and the a.c. voltage exceed the respective first and second threshold levels said amplifying means being inhibited in the event either of said voltages has less amplitude than their respectivve threshold levels, and
   d. means for preventing translation of said a.c. voltage to the output of said amplifier.

4. The combination as defined in claim 3, wherein said means for preventing translation of the a.c. voltage to the output of said amplifier comprises a capacitor connected between the input of said amplifier and ground so that said a.c. voltage is suppressed in the event both the amplitudes of the d.c. voltage and a.c. voltage are greater than their respective threshold levels but at the same time permitting said message signals to be applied by the line to said amplifier.

5. The combination as defined in claim 4, in which said a.c. voltage is comprised of a pilot tone.

6. The combination as defined in claim 4, in which said a.c. voltage is of subaudible frequency.

7. The combination as defined in claim 6, in which said amplifier is connected to a transducer which comprises a loudspeaker, adapted to receive audio frequency tones and voice messages as message signals from the line.

8. The combination as defined in claim 3, in which the means for amplifying an a.c. voltage comprises means for discriminating all a.c. voltage frequencies below a predefined frequency and for amplifying only frequencies above the predefined frequency.

9. The combination as defined in claim 3, in which said first threshold level for said d.c. voltage is greater than the voltage appearing across a busy telephone line, and less than the voltage appearing across an idle telephone line.

10. The combination as defined in claim 3, wherein said enabling means includes means for applying the d.c. voltage appearing on said line as power supply current for energizing the amplifier only when said d.c. voltage exceeds the amplifier d.c. voltage threshold.

11. An amplifier for connection to a transmission line comprising:
   a. first means for detecting a first enabling d.c. voltage above a prescribed first threshold level,
   b. second means responsive to said first means for detecting a second enabling a.c. voltage above a prescribed second threshold level,
   c. means for amplifying a signal different from said a.c. voltage or said d.c. voltage appearing on said line upon detection of both the d.c. and a.c. voltage levels by said first and second means in excess of the respective first and second threshold levels, including means for barring said amplification in the event either of the d.c. or a.c. voltage levels are less than the respective thresholds, and
   d. means for preventing amplification of said enabling a.c. voltage.

12. In combination with an amplifier for connection to a transmission line, the improvement comprising:
   a. means for sensing the presence of a d.c. voltage carried by the transmission line, and for providing an enabling voltage in the event the d.c. voltage is above a predetermined amplitude threshold,
   b. means enabled by said enabling voltage for sensing a predetermined a.c. voltage carried by the transmission line, and for enabling operation of said amplifier in the event said a.c. voltage has an amplitude above a second predetermined amplitude threshold, and
   c. means for inhibiting translation of said predetermined a.c. voltage by the enabled amplifier, while allowing translation of other audio frequency signals which may be present on the transmission line.

13. An amplifier as defined in claim 12, wherein said enabling means includes means for applying direct current from the transmission line to the signal amplifier upon the d.c. voltage exceeding the amplifier d.c. voltage threshold for powering the signal amplifier therefrom.

14. In combination with an amplifier for connection to a telephone type line, the improvement comprising:
   a. first means for sensing a d.c. voltage above a first threshold level carried by the line,
   b. second means for sensing a predetermined a.c. voltage above a second threshold level carried by the line,
   c. means for enabling operation of said amplifier to amplify message signals different than said a.c. voltage carried by the line in the event the amplitude of both the d.c. voltage and said a.c. voltage exceed the respective first and second threshold levels, and for inhibiting operation of the amplifier in the event either the d.c. voltage or said a.c. voltage has less amplitude than their respective threshold levels.

15. The combination as defined in claim 14, including means for suppressing amplification in the amplifier of said a.c. voltage in the event both the amplitudes of the d.c. voltage and the a.c. voltage are greater than their respective said threshold levels, but at the same time for amplifying said message signals which may be carried by the line.

16. The combination as defined in claim 15, in which said a.c. voltage is comprised of a pilot tone.

17. The combination as defined in claim 15, in which said a.c. voltage is of subaudible frequency.

18. The combination as defined in claim 17, further including an electro-acoustic transducer coupled to the output of the amplifier for reproducing audio frequency signals as message signals from the line.

19. The combination as defined in claim 14, in which the means for enabling operation of said amplifier comprises means for discriminating all a.c. voltage frequencies below a predefined frequency and for amplifying only frequencies above the predetermined frequency, the frequency of the predetermined a.c. voltage being below the predefined frequency.

20. The combination as defined in claim 14, in which said predetermined threshold for d.c. voltage is greater than the d.c. voltage appearing across a busy telephone line, and less than the d.c. voltage appearing across an idle telephone line.

21. The combination as defined in claim 14, wherein said enabling means includes means for applying direct current appearing on the line as power supply current for energizing the amplifier.

22. In combination with an amplifier for connection to a transmission line, the improvement comprising:
   a. means establishing a first enabling d.c. voltage threshold level,
   b. means establishing a second enabling a.c. voltage threshold level,
   c. means for translation of a separate message signal appearing on said line by said amplifier upon receipt by said amplifier of both d.c. and a.c. enabling voltages in excess of the respective threshold levels, for barring translation of the a.c. enabling voltage, and for barring translation of the separate message signal in the event either of the d.c. or a.c. enabling voltages are less than the respective threshold levels.

23. The combination as defined in claim 22, in which the amplifier comprises means for amplifying only said message signals which are above a predetermined frequency range.

24. The combination as defined in claim 23, in which the amplifier is a differential amplifier, further including means for applying alternating current signals below said predetermined frequency range in phase to said amplifier whereby they are canceled, and for applying alternating current signals above said predetermined frequency range differentially whereby they are amplified.

25. The combination as defined in claim 24, including means for applying alternating frequency signals to two inputs of said differential amplifier in phase, and for bypassing alternating frequency signals above said predetermined frequency range from one of the inputs to provide a differential signal whereby said differential signal, representative of the alternating frequency signal above said predetermined frequency range, is amplified by the differential amplifier.

* * * * *